G. J. MEYER.
APPARATUS FOR MAKING MALT.
APPLICATION FILED OCT. 17, 1908.
936,011.
Patented Oct. 5, 1909.
3 SHEETS—SHEET 1.
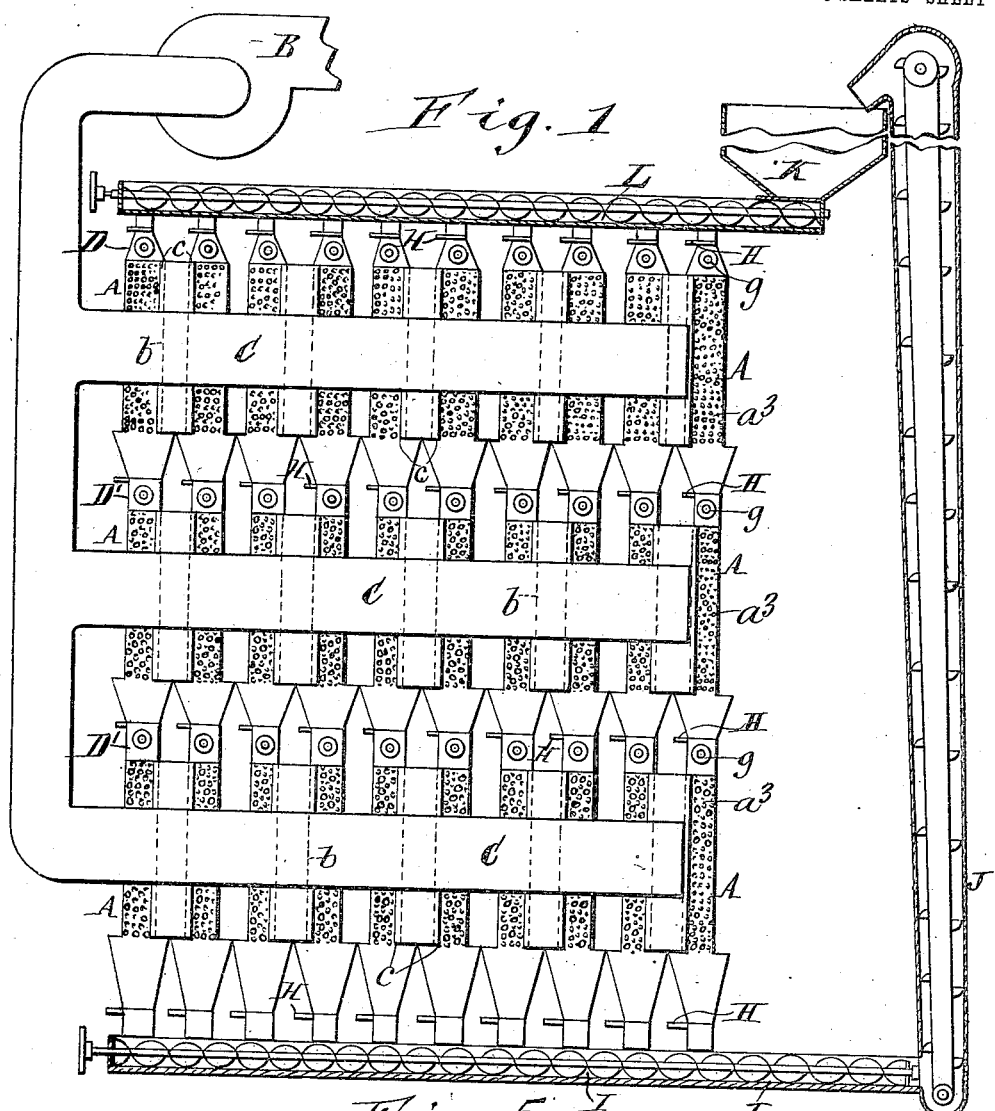
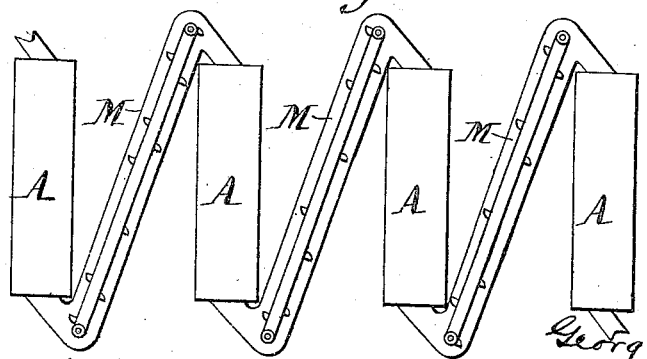

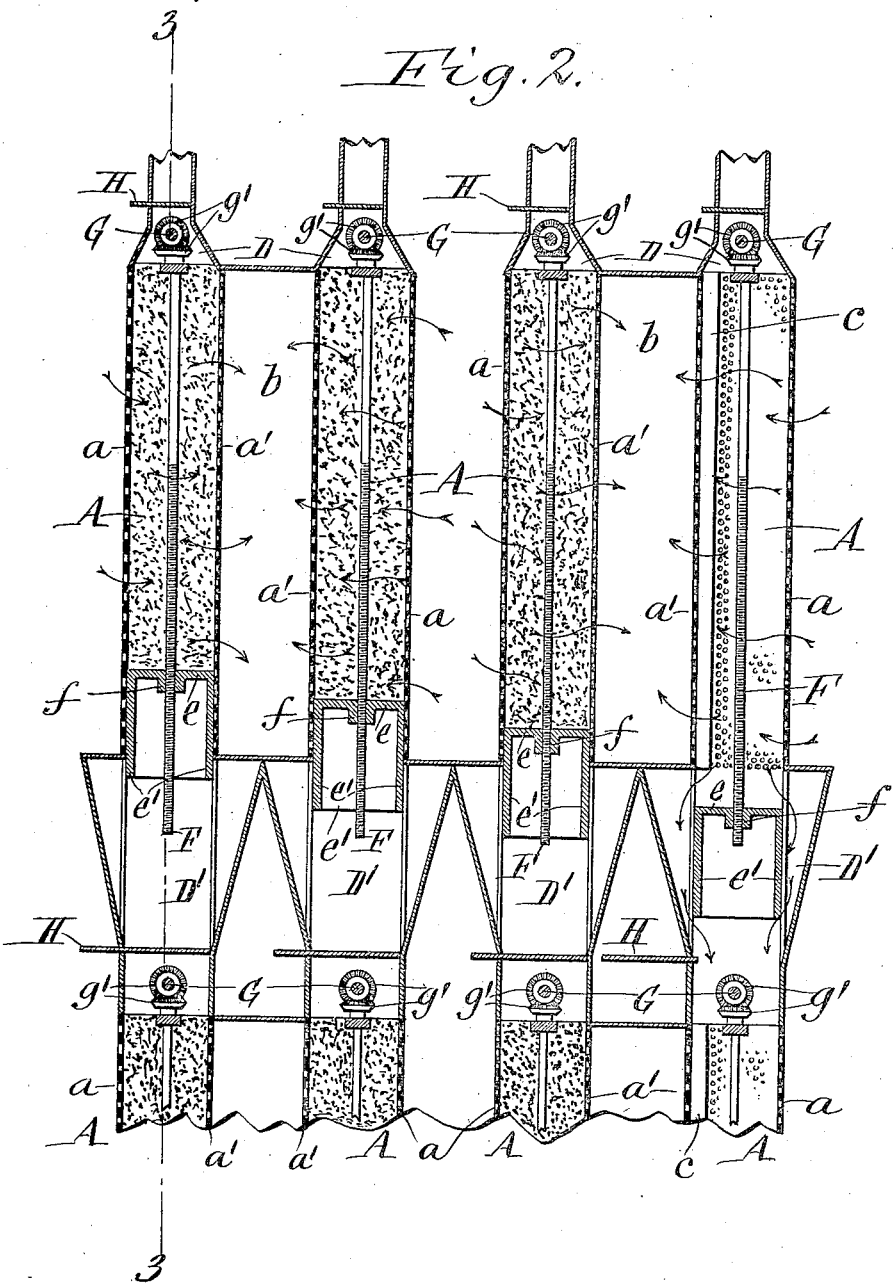

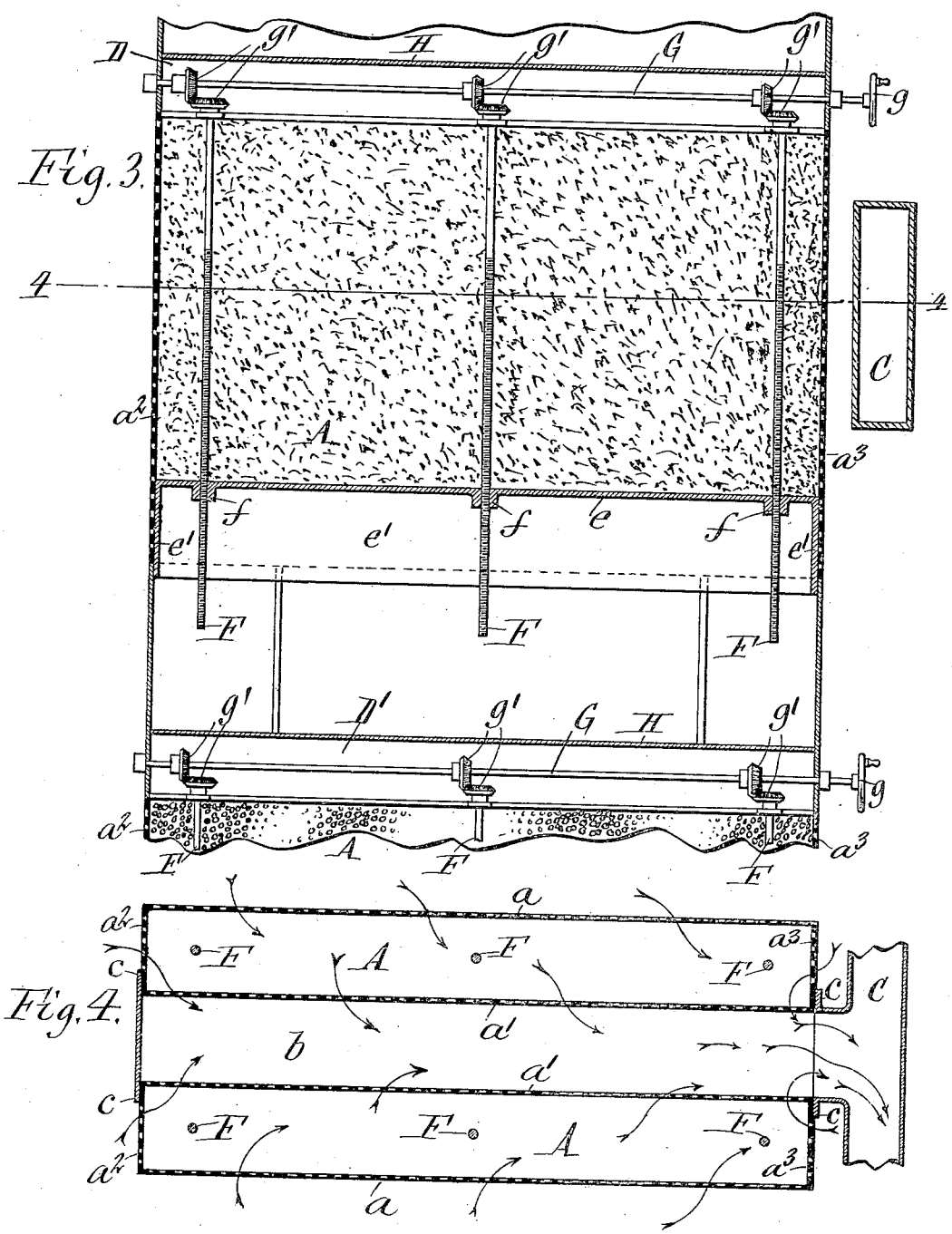

UNITED STATES PATENT OFFICE.

GEORGE J. MEYER, OF BUFFALO, NEW YORK.

APPARATUS FOR MAKING MALT.

936,011.  Specification of Letters Patent.  Patented Oct. 5, 1909.

Application filed October 17, 1908. Serial No. 458,217.

*To all whom it may concern:*

Be it known that I, GEORGE J. MEYER, a citizen of the United States, residing at Buffalo, in the county of Erie and State of New York, have invented a new and useful Improvement in Apparatus for Making Malt, of which the following is a specification.

Heretofore malting has usually been effected by tumbling barley or other grain around in rotatable drums or turning the same over periodically by hand or mechanical shovels while the same is supported in thin horizontal layers on a floor or in shallow boxes. None of these systems utilize the overhead space in the rooms of malt houses and therefore are not economical in this respect.

One of the objects of this invention is to utilize this overhead space to the fullest extent and thereby increase the malting capacity of a building of certain dimensions.

My invention has the further object to simplify the means whereby malting is effected so as to reduce the cost thereof and also insure a more thorough mixing of the barley from time to time during the malting operation so as to insure a more uniform product.

In the accompanying drawings consisting of 3 sheets: Figure 1 is a side elevation representing one form of malting apparatus embodying my invention. Fig. 2 is a fragmentary vertical transverse section of several sections of my improved malting apparatus, on an enlarged scale. Fig. 3 is a vertical longitudinal section in line 3—3, Fig. 2. Fig. 4 is a fragmentary horizontal section in line 4—4, Fig. 3. Fig. 5 is a diagrammatic side elevation showing a modification of a malting apparatus embodying my invention.

Similar letters of reference indicate corresponding parts throughout the several views.

In its broadest aspect my improved method of malting and the apparatus for carrying the same into effect consists in supporting a charge or batch of barley or other grain in the form of a comparatively narrow upright wall or column through which air of the proper temperature and moisture is drawn horizontally from one side thereof to the other. The preferred means for accomplishing this consists in providing a barley or grain receptacle or chamber A having upright perforated longitudinal walls $a$, $a^1$ and upright perforated transverse walls $a^2$, $a^3$ and supplying the air to the outer side of one of the longitudinal and the transverse walls and withdrawing the air from the other longitudinal wall. The air may be supplied to the inlet perforations of the malting chamber in any suitable manner but preferably by exposing the walls $a$ containing the inlet perforations to the atmosphere within the building, so that the air is drawn directly therefrom. Before admitting the air to the barley the same may be heated or cooled to the proper temperature and moistened as required to produce the desired effect upon the barley through which it is drawn horizontally. The air is withdrawn from the malting chamber by means of a main conduit C which is connected with an exhaust fan B, as shown in Fig. 1, or an exhausting device of any other suitable character. When a plurality of such malting chambers are arranged horizontally side by side the adjacent outlet sides of two adjacent chambers are connected by a single branch air outlet conduit $b$ with the main conduit C, as shown in Figs. 1, 2 and 4. In the absence of any provision to prevent it, a part of the air could make a short cut through the barley at the corners of the end walls $a^2$, $a^2$ and the longitudinal outlet wall $a^1$ of the chamber at which places only small quantities of barley are present and therefore offer less obstruction to the passage of air, thereby permitting more air to pass through the body of the barley at these places and cool the same unduly. To prevent the air from thus passing directly through the shallow or thin parts of the body of barley at the outlet corners thereof, the adjacent part of the malting chamber is made imperforate or solid, this being preferably effected by employing solid baffle plates $c$ to form the end air inlet walls of the malting chamber adjacent to the corner between the same and the longitudinal outlet wall thereof, as shown in Figs. 1, 2 and 4. By this means the air drawn can not be drawn in excess quantities through the inner corners of the body of grain but is directed away from said corners, thereby avoiding undue cooling of the same and insuring uniformity in the germination of the barley and the malt resulting therefrom.

The barley to be malted is delivered through a spout D into the upper end of the malting chamber and after the same has remained in this chamber a sufficient length of time it is discharged therefrom at the lower end thereof. As the barley germinates in each malting chamber it swells and requires more room than when first placed in this chamber. In order to allow for this swelling of the barley and prevent the same from becoming matted or packed in the chamber, a movable follower is provided for the lower end of each malting chamber which is preferably mounted in the lower end of the malting chamber so as to be vertically adjustable therein, and which is composed of a horizontal bottom $e$ which extends horizontally across the entire malting chamber, and vertical sides or shutters $e^1$ extending downwardly from the transverse and longitudinal edges of the bottom, as shown in Figs. 2 and 3. When the barley is first put into the malting chamber the adjustable follower is raised into its highest position or nearly so, as shown at the left of Fig. 2, and as the barley gradually swells this follower is lowered gradually, as shown in the intermediate chambers in Fig. 2, whereby additional room is provided in the malting chamber which permits of this swelling of the barley and prevents the matting or packing of the same which otherwise would occur. While the follower is in its elevated position in the malting chamber, its shutters or sides $e^1$ move across and close those portions of the perforated transverse and longitudinal walls $a$, $a^1$, $a^2$, $a^3$ which for the time being are not in use, thereby preventing air from passing through the same and the lower part of the chamber. Any suitable means may be provided for thus raising and lowering the follower. The means for this purpose shown in the drawings, consist of a plurality of upright screw shafts F which are journaled at their upper ends in bearings within the malting chamber while their lower ends work in screw nuts $f$ on the follower, and a horizontal adjusting shaft G having a handle $g$ outside of the malting chamber and connected within the latter with the upper end of each screw shaft by means of a pair of intermeshing bevel gear wheels $g^1$. Upon discharging the barley from the lower end of one of the malting chambers the same may be delivered by a spout $D^1$ into the upper end of a similar chamber arranged immediately below the same, as shown in Figs. 1–3. After the transfer of the barley from an upper to a lower malting chamber has been thus effected, communication between the same may be cut off by a suitable valve device. If desired, the follower may be utilized to perform the function of a valve or cut off for this purpose by lowering the same below the lower end of the malting chamber, as shown at the right of Fig. 2, whereby the malt is permitted to flow downwardly around the follower from an upper to a lower malting chamber and by raising the follower so that its bottom $e$ is in line with or above the lower end of the malting chamber, this end of the malting chamber is closed and cut off from the next lower chamber, as shown at the left of Fig. 2. During the movement of the barley from one chamber to another the same is agitated, stirred or mixed so that the barley upon reaching the lower compartment does not occupy the same relative position which it did in the upper compartment, thereby insuring a more uniform germination of the same. After the barley has been thus discharged from an upper to a lower compartment the follower is again raised into a position in which it closes the lower end of the respective malting chamber preparatory to filling the same with another batch of barley. If desired, additional transversely-sliding valves H may be employed in each supply spout, chute, hopper or spout D, $D^1$ immediately above the gearing $g^1$ so as to cut off the dead air space in these spouts from the malting chambers and in the outlet of the lowermost chambers. As the barley is discharged from the lowermost compartment of any one of the vertical tiers the same may be delivered into a lower horizontal conveyer I which latter delivers the same to the foot of an elevator J, whereby the barley is raised into an elevated storage bin or hopper K. From the latter the barley may then be delivered by means of an upper horizontal conveyer L to the uppermost one of any of the vertical tiers of malting chambers each of which may be connected with or disconnected from the upper conveyer by a slide valve H, as shown in Figs. 1, 2 and 3 or by any other suitable means.

When the apparatus is in full working condition the operation of malting is going on in the several malting chambers of each tier but the barley in each successive lower chamber is advanced one stage in the operation of malting beyond that in the chamber above the same. As each lower chamber is emptied of its contents the same is filled with the barley from the chamber next above the same, whereby the barley is caused to be advanced from one malting chamber to another and is thoroughly mixed while being transferred, thereby causing the same to germinate uniformly and insuring a superior product.

The ordinary operation of malting barley requires about six days' time and can therefore be effected by treating a batch of barley six days in succession in a malting chamber of my improved construction by changing and mixing the barley about once each day.

As shown in Fig. 1, each tier comprises three malting chambers, whereby a batch of barley can be malted by successively passing the same twice downwardly through the same tier or through two different tiers of chambers. If the height of the building permits, each tier may contain six or more malting chambers, thereby enabling a batch of barley to be malted from the time it enters the uppermost compartment of a tier to the time it leaves the lowermost compartment of the same tier. By thus successively dropping a batch of barley which is being malted from one compartment to another and mixing the same during this transferring operation the mechanism for effecting the malting is much simplified and the cost is materially reduced, inasmuch as no special mechanism is required for this purpose and no power is consumed because the transfer and mixing is effected by gravity. When the height of the building does not permit of arranging one malting compartment or chamber above another, the same may be arranged side by side, as shown in Fig. 5, and the transfer of the malt from the lower end of one malting chamber into the upper end of the next chamber may be effected by an elevator M, as shown in this figure.

The drying of the moist germinated grain for completing the malting operation is effected by successively passing the grain or barley, after the germinating process, from one malting chamber to another as the drying of the same progresses, it being necessary at this time to omit moistening of the air and instead raise the temperature of the air which is supplied to the malting chambers so as to facilitate the drying of the grain or malt. When the malting chambers are thus used for drying the germinated grain the followers at the lower ends thereof are raised successively for adjusting the capacity of the chamber to the shrinkage of the grain during the drying operation.

I claim as my invention:

1. A malting apparatus comprising an upright rectangular malting chamber having perforated side inlet and outlet walls and perforated end walls and adapted to contain a body of grain, and means for causing a current of air to flow through said chamber and body, said chamber having imperforate portions adjacent to the corners between its air outlet wall and its end walls.

2. An apparatus of the character described comprising a stationary upright chamber adapted to contain a body of grain, and a vertically movable follower arranged in the lower part of said chamber.

3. A malting apparatus comprising an upright perforated rectangular malting chamber adapted to contain a body of grain, and a vertically movable follower arranged in said chamber.

4. A malting apparatus comprising an upright perforated rectangular malting chamber adapted to contain a body of grain and having an inlet at its upper end and an outlet at its lower end, and a vertically movable follower arranged in the lower part of said chamber.

5. A malting apparatus comprising an upright perforated rectangular malting chamber adapted to contain a body of grain and having an inlet at its upper end and an outlet at its lower end, and a vertically movable follower arranged in the lower part of said chamber and operating to open and close the outlet of said chamber.

6. A malting apparatus comprising an upright perforated rectangular malting chamber adapted to contain a body of grain and having an inlet at its upper end and an outlet at its lower end, and a vertically movable follower arranged in the lower part of said chamber and having a horizontal bottom which extends horizontally across the space within said chamber and shutters depending from said bottom and engaging with the inner sides of the opposite inlet and outlet walls of the chamber.

7. A malting apparatus comprising an upright perforated rectangular malting chamber adapted to contain a body of grain and having an inlet at its upper end and an outlet at its lower end, a vertically movable follower arranged in the lower part of said chamber, and means for raising and lowering said follower.

8. A malting apparatus comprising an upright perforated rectangular malting chamber adapted to contain a body of grain and having an inlet at its upper end and an outlet at its lower end, a vertically movable follower arranged in the lower part of said chamber, and means for raising and lowering said follower comprising an upright screw shaft working in a screw nut on the follower and a transverse shaft connected by gearing with the upright shaft.

Witness my hand this 13th day of October, 1908.

GEORGE J. MEYER.

Witnesses:
THEO. L. POPP,
ANNA HEIGIS.